Oct. 18, 1966   R. A. ENGLANDER ET AL   3,279,579
APPARATUS FOR TRANSPORTING CYLINDRICAL ARTICLES
Filed May 5, 1964   2 Sheets-Sheet 1
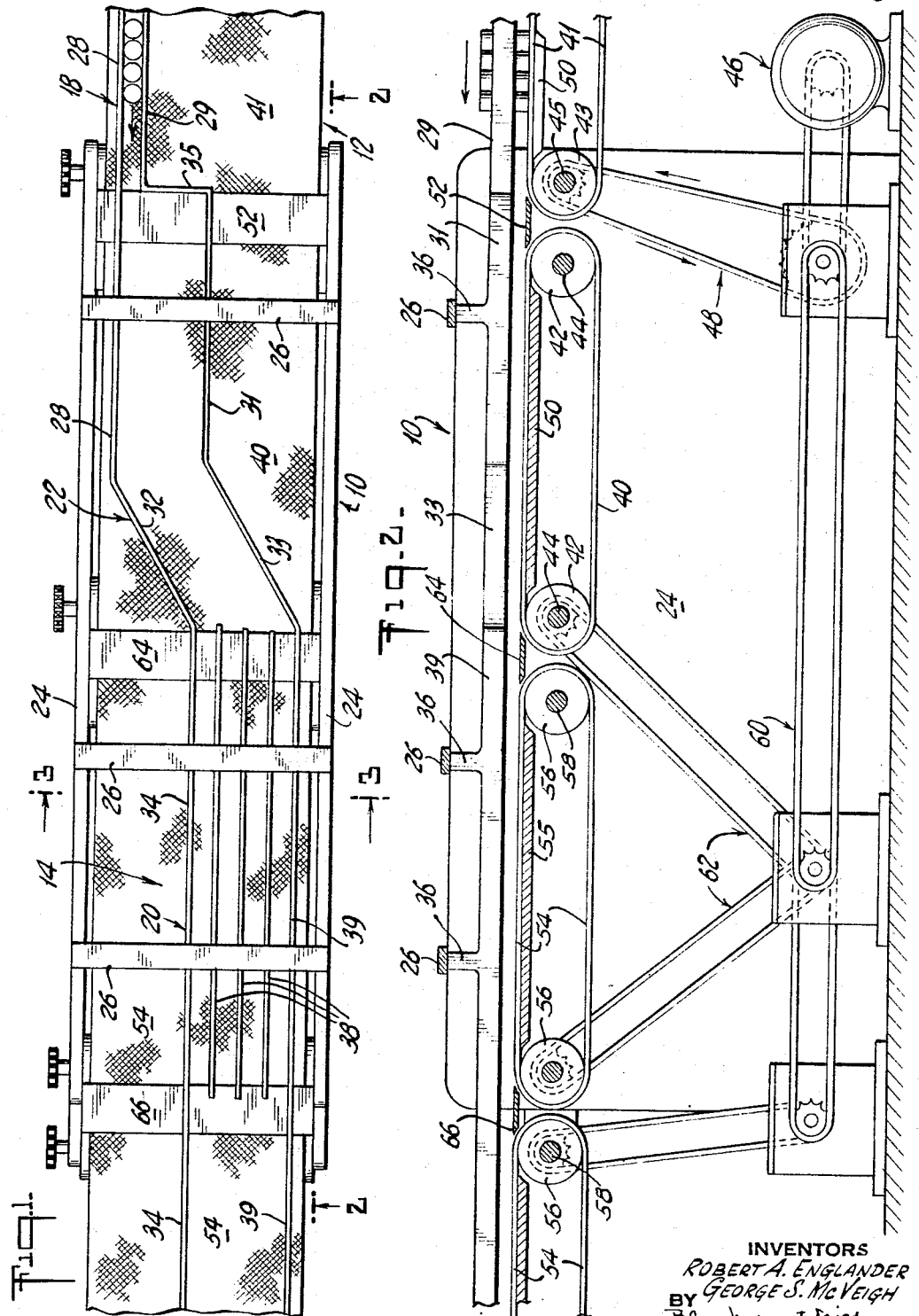
INVENTORS
ROBERT A. ENGLANDER
GEORGE S. McVEIGH
BY
ATTORNEYS Oct. 18, 1966   R. A. ENGLANDER ET AL   3,279,579
APPARATUS FOR TRANSPORTING CYLINDRICAL ARTICLES
Filed May 5, 1964   2 Sheets-Sheet 2
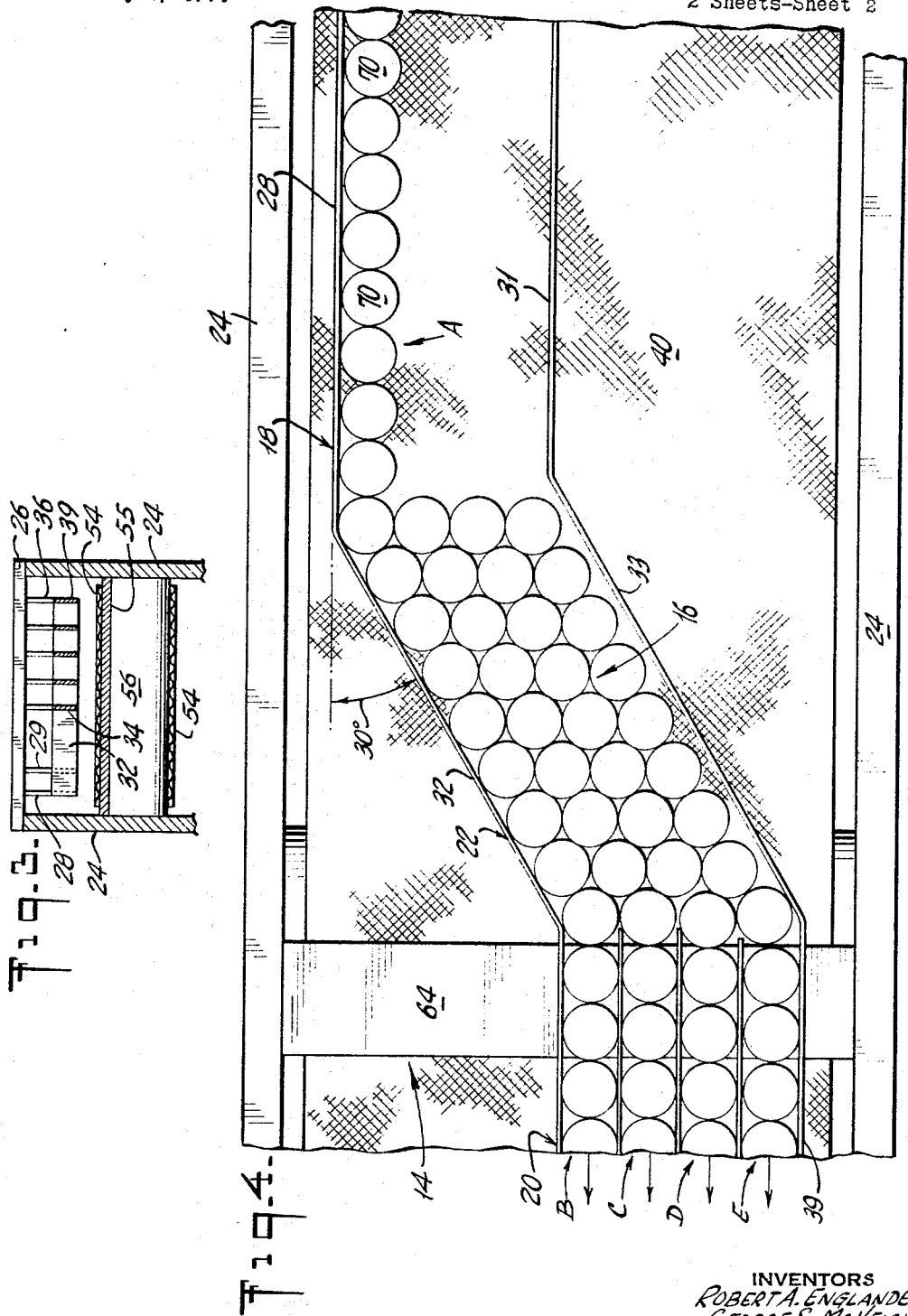
INVENTORS
ROBERT A. ENGLANDER
GEORGE S. McVEIGH
BY
ATTORNEYS

United States Patent Office 3,279,579
Patented Oct. 18, 1966

3,279,579
APPARATUS FOR TRANSPORTING CYLINDRICAL ARTICLES
Robert A. Englander and George S. McVeigh, Lynchburg, Va., assignors to Simplimatic Engineering Company, Lynchburg, Va., a partnership
Filed May 5, 1964, Ser. No. 364,910
7 Claims. (Cl. 198—31)

The present invention relates to an apparatus for transporting cylindrical articles.

In particular, the present invention relates to apparatus for transporting cylindrical articles such as cans which contain edible products, for example.

At the present time the processing of cylindrical articles of this type requires that at a certain stage in the processing the number of rows of cylindrical articles be increased considerably and at high speed for further processing of the cylindrical article such as for packaging.

For example, in the case of cans of beer it is known that such cans are conveyed from a pasteurizer in a single row, for example. However, in order to be transported from such a single row to suitable packaging apparatus, for example, it is necessary to increase the number of rows considerably and at high speed, and at the present time there are serious limitations on the extent to which it is possible to increase the number of rows of cylindrical articles of this type at high speed.

One of the known devices for increasing the number of rows of such articles is a star wheel type of mechanism which operates effectively up to a rate of 600 units per minute, but beyond this speed insurmountable problems are encountered, so that this type of known mechanism is seriously limited.

In order to attempt to increase the speed of the operations it has already been proposed to use magnetic mechanisms where cylindrical articles arranged in a zig-zag pattern are magnetically pulled apart from each other into a pair of rows, so that in this way the number of rows is increased by such a magnetic mechanism, but, of course, this type of construction is seriously limited since the magnets will work effectively on steel cans but are completely ineffective on glass or aluminum cans, and high speed canning operations would involve aluminum cans to a far greater extent were it not for the problem of dividing the cans into a sufficiently great number of rows in a high speed operation.

Cylindrical articles have the inherent property of nesting with respect to each other. Thus, as such articles are conveyed along a given path each cylindrical article tends to engage and become located between an adjacent pair of cylindrical articles so that in this way the cylindrical articles nest within each other preventing the central axes of the articles from remaining in straight rows since the nesting displaces the articles laterally with respect to each other, and it is this nesting property which has rendered mechanical separation of the articles into a plurality of rows difficult to carry out.

It is accordingly one of the primary objects of the present invention to provide a structure which is capable of effectively dividing one or more rows of cylindrical articles into a plurality of rows of cylindrical articles with the number of the latter plurality of rows being greater than the number of rows of the articles before they are divided, to an extent which will greatly increase the speed of operation, as compared to known high speed operating devices of this type, without requiring the use either of star wheel mechanisms or magnetic mechanisms.

A further object of the present invention is to divide a given number of rows of cylindrical articles into a greater number of rows to an extent which has heretofore not been possible with a purely mechanical structure which will operate effectively irrespective of the material of which the articles are made, so that the structure of the invention will work equally well on glass, aluminum, steel, or fiber cans.

Yet another object of the present invention is to provide a structure of the above type which takes advantage of the nesting properties of cylindrical articles to divide a given number of rows thereof into a larger number of rows with a simple structure which will operate very effectively.

The objects of the present invention also include a structure capable of accomplishing the above objects while at the same time being exceedingly simple and rugged so that it is inexpensive to manufacture and maintain.

Primarily the present invention is based on the discovery that if the direction of movement of a row of cylindrical articles is changed by approximately 30° the articles will nest into each other so that they can very conveniently be divided into any desired number of rows but at the same time there will be absolutely no tendency of the articles to jam or in any way to retard their transportation as long as the 30° deflection in the path of movement of the articles is not exceeded by 5° one way or the other.

The invention is illustrated, by way of example, in the accompanying drawings which form part of the application and in which:

FIG. 1 is a top plan view of that part of an article transporting apparatus which includes one possible embodiment of a structure according to the present invention;

FIG. 2 is a partly sectional side elevation of the structure of FIG. 1 taken along line 2—2 of FIG. 1 in the direction of the arrows;

FIG. 3 is a transverse section of the structure of FIG. 1 taken along line 3—3 of FIG. 1 in the direction of the arrows; and FIG. 4 is a top plan view showing on an enlarged scale, as compared with FIG. 1, that part of the structure of FIG. 1 which includes a row-increasing zone of the invention.

The article transporting apparatus 10 indicated in FIG. 1 includes an infeed conveyor means 12 and a discharge conveyor means 14. The discharge conveyor means 14 is in line with the infeed conveyor means 12. The infeed conveyor means 12 serves to convey cylindrical articles such as the cans 70, described below in connection with FIG. 4, from the right toward the left, as viewed in FIG. 1, to a predetermined row-increasing zone 16 where the number of rows of cylindrical articles is increased, and the discharge conveyor means 14 receives the articles at the row-increasing zone 16 and discharges the articles away from the row-increasing zone 16.

An infeed guide means 18 is situated over and extends longitudinally of the infeed conveyor means 12 for guiding the cylindrical articles in at least one straight row extending longitudinally of the infeed conveyor means 12 as the articles advance toward the row-increasing zone 16. A discharge guide means 20 is located over and extends longitudinally of the discharge conveyor means 14 for guiding the cylindrical articles in a plurality of rows the number of which is greater than the number of rows provided by the infeed guide means 18, and it will be seen from FIG. 1 that the discharge guide means 20 is laterally offset with respect to the infeed guide means 18. Located at the row-increasing zone 16 is a deflecting means 22 which is operatively connected with the infeed guide means 18 and discharge guide means 20 for deflecting the articles at the row-increasing zone so that their path of movement is changed by approximately 30° as the articles are advanced through the row-increasing zone 16 to the discharge conveyor means 14.

The supporting structure includes a pair of elongated parallel side frame memebrs 24 which are fixed at their upper edges to a plurality of cross bars 26 which extend across the space between and are carried by the side frame members 24.

The infeed guide bar means 18 includes an elongated straight substantially rigid bar 28 which has an upwardly directed extension 36' fixed in any suitable way to one of the cross bars 26 so that in this way the infeed guide bar 28 is supported over and extends longitudinally of the infeed conveyor means 12. The infeed guide means 18 also includes a second bar 29 parallel to the bar 28 and spaced therefrom by a distance approximately equal to the diameter of the cylindrical articles. and the bar 29 is supported in the same way as bar 28 from cross members 26.

The deflecting means includes an elongated straight bar 32 which is fixed at one end to the infeed guide bar 28, and the deflecting bar 32 defines with the bar 28 an angle of approximately 150°, for a purpose referred to below, and at its end which is distant from the bar 28 the deflecting bar 32 is fixed to an elongated guide bar 34 which forms an end guide bar of the discharge guide means 20. It will be noted that the discharge guide bar 34 is parallel to and laterally offset with respect to the infeed guide bar 28. The bar 34 has a plurality of upwardly directed extensions 36 fixed to the underside of a plurality of cross members 26 so that in this way the bar 34 is supported over and extends longitudinally of the discharge conveyor means 14, and the discharge guide means 20 includes a plurality of additional bars 38, 39 parallel to each other and to the bar 34, spaced from each other by a distance approximately equal to the diameter of the cylindrical articles which are to be conveyed, all of the bars 38 and 39 having upwardly directed extensions 36 fixed to the undersides of the cross bars 26 so as to be supported thereby over the discharge conveyor means 14 extending longitudinally thereof, as shown in FIG. 1. The intermediate discharge guide bars 38 are situated between the end discharge guide bars 34 and 39, and at its end which is adjacent to the row-increasing zone 16 the end discharge guide bar 39 is fixed to an elongated straight bar 33 which extends parallel to the deflecting bar 32 and which is in turn fixed to an elongated guide bar 31 parallel to that part of bar 28 which extends over the row-increasing zone 16 and spaced therefrom by a distance equal to the distance between parallel bars 32 and 33. A transverse bar 35 is fixed to free ends of the bars 29 and 31.

The infeed conveyor means 12 includes one or more endless belts 41 supported for rotary movement by suitable rollers 43 which are in turn fixed on shafts 45 which are carried by any suitable bearings which are in turn supported by the side frame members 24, and some of the shafts 45 extend outwardly beyond one of the side frame members 24 to be connected to suitable transmission elements, such as sprocket wheels, pulleys, or the like, for the purpose of driving the endless belts 41. The endless bands or belts 41 form well known tabletop or flattop conveyor chain assemblies which may be composed of a metal mesh, for example. A suitable source of power 46, shown in the lower right of FIG. 2, in the form, for example, of an electric motor or the like, drives through a suitable transmission 48, composed of belts and pulleys or endless chains and sprocket wheels, the endless conveyors 41 in the manner shown diagrammatically in FIG. 2. The upper runs of the endless conveyors 40 are located directly over flat rigid plate members 50 so that in this way the upper runs are maintained perfectly flat.

Row-increasing zone 16 is formed by an endless conveyor 40 carried by rollers 42 which are fixed to shafts 44 which are supported for rotation by bearings carried by walls 24. The left shaft 44 of FIG. 2 extends out beyond wall 24 and fixedly carries a sprocket wheel so as to be driven by a suitable transmission. A rigid plate 50 also supports the upper run of belt 40, this plate 50 extending between and being fixedly carried by the frame members 24. Endless conveyor 40 forms an intermediate conveyor means situated between infeed conveyor means 12 and discharge conveyor means 14. Between the endless conveyors 40 and 41 is an elongated plate 52 which extends between and is fixedly carried by the side members 24, in the same way that the plate 55 extends between and is fixedly carried by the side frame members 24, so that the conveyor articles will move smoothly from endless conveyor 41 to the endless conveyor 40.

The discharge conveyor means 14 has a construction very similar to that of the infeed conveyor means 12. Thus, the discharge conveyor means 14 includes a plurality of endless conveyors 54 of the same structure as the endless conveyors 40 and 41 and supported by rollers 56 which are in turn fixed on suitable shafts 58 carried by suitable bearings which are supported by the side frame members 24, and in this case also certain ones of the shafts 58 extend outwardly beyond one of the side frame members 24 to carry transmission members in the form of pulleys, sprocket wheels, or the like. As is apparent from FIG. 2, a transmission 60 transmits the drive from the transmission 48 to a further transmission 62 also made up of any suitable combination of belts and pulleys or sprocket wheels and sprocket chains, as shown particularly in FIG. 2. It is to be noted from FIG. 2 that the transmission is such that the endless conveyors 40 and 54 will be driven at a speed less than the speed with which the conveyors 41 are driven and in the instant example a 1:4 ratio is used corresponding to the ratio of rows. Plates 55 identical with plates 50 extend between and are carried by the side frame members 24 and are situated beneath the upper runs of the endless conveyors 54 so as to maintain them perfectly flat. A plate 64 extends between and is carried by the side frame members 24, and this plate 64 provides a smooth transition for the articles from the row-increasing zone 16 to the discharge conveyor means 14, and an additional plate 66 is carried by the side frame members 24 and is situated between the pair of endless conveyors 54 in order to provide a smooth transition therebetween.

The manner in which the structure of the invention operates is best illustrated in FIG. 4. As may be seen from FIG. 4, the conveyor 40 extends beneath the row-increasing zone 16 so that the articles received from the infeed conveyor means 12 at the row-increasing zone 16 are conveyed through the row-increasing zone 16 at the same speed as they are subsequently conveyed by the discharge conveyor means 14. In the illustrated example the articles are in the form of cylindrical cans 70 which may, for example, be beer cans which are delivered by the infeed conveyor means 12 from a pasteurizer to the row-increasing zone 16. In the illustrated example, the infeed guide means 18 provides a single straight row of cans 70 extending longitudinally of the infeed conveyor means 12, but it is to be understood that the invention is equally applicable to a structure which provides, for example, two or more rows of cylindrical articles which are conveyed to the row-increasing zone 16.

At the row-increasing zone 16 the deflecting means 22 deflects the articles 70 so as to change their direction of travel by 30°, as indicated in FIG. 4. As is also illustrated in FIG. 4, the cylindrical articles nest within each other at the row-increasing zone so as to form a group of articles as illustrated in FIG. 4 at the row increasing zone 16. It is particularly to be noted that although there is an additional elongated bar 33 parallel to the bar 32 and connected between the bars 39 and 31, nevertheless the articles 70 do not engage the bar 33 except at its end portion which is adjacent to the discharge end guide bar 39, so that a considerable portion of the bar 33 may be omitted if desired.

It is to be noted that with the cylindrical articles nested at the row-increasing zone 16 as illustrated in FIG. 4, the central axes of any group of three engaging articles 70 form in a plane normal to these axes an equilateral triangle, and the angle of deflection equals of course one-half of each angle of this triangle. It has been found that by providing a deflection angle of 30° the articles while nesting within each other in the manner shown in FIG. 4 nevertheless have no tendency to jam and move quite smoothly from the infeed guide means 18 to the discharge guide means 20. Increasing or decreasing the angle 30 to a slight extent does not materially change the operation. However, when this angle of 30° is increased in either direction by over 5° it has been been found that jamming does indeed occur so that the angle of deflection provided by the deflecting means 22 is ideal precisely at 30° but may range between 25° and 35°, although at the limits of this range of from 25° to 35° there may be such a smooth operation and beyond this range jamming will result.

In the particular example illustrated, a single row A of articles 70 is guided by the infeed guide means 18 to the row-increasing zone 16 where the deflecting means 22 deflects the articles so as to change the direction of movement thereof by approximately 30°, and the single row A is divided in the illustrated example into four rows B, C, D, E. The several parallel guide bars of the discharge guide means 20 guide the articles 70 in these latter four rows, and it is to be noted that the plate 64 is situated at the transition between the row-increasing zone 16 and the discharge conveyor means 14 so that the articles move smoothly from the row-increasing zone 16 to the discharge conveyor means 14. As was indicated above the conveyors 54 and 40 of the discharge conveyor means 14, zone 16 moves at a slower speed than the conveyors 41 of the infeed conveyor means 12, and in the illustrated example the speed of the conveyors 54 and 40 is one-fourth the speed of the conveyors 41. Whatever the number of rows of articles conveyed by the discharge conveyor means 14, the speed of movement thereof will always have with the relation to the speed of movement of the infeed conveyors the same ratio as the number of rows provided by the infeed guide means 18 to the number of rows provided by the discharge guide means 20.

It is thus apparent that with the structure of the invention, primarily as a result of the deflection angle of approximately 30° which is provided by the deflecting means 22, it is possible to convey cylindrical articles in such a manner that advantage is taken of their inherent nesting properties to divide the articles into a relatively large number of rows so that the speed of the operation can be very high, certainly much higher than heretofore possible, without requiring the use of star wheel mechanisms or magnetic mechanisms, and the cylindrical articles will be treated with the structure of the invention in precisely the same way irrespective of the material of which the articles are made, so that with the invention it is possible to handle aluminum cans as well as glass cans or cans made of other fibrous materials, and, of course, steel cans can be handled also without any difficulty, so that the range of materials which can be used for the cans is in no way limited by the structure of the invention, and at the same time a very high output far beyond 600 cans per minute can be achieved with the structure of the invention.

While a specific embodiment of the invention has been shown and described in detail to illustrate the application of the principles of the invention, it will be understood that the invention may be embodied otherwise without departing from such principles.

What is claimed is:

1. Apparatus for transporting cylindrical articles, comprising infeed conveyor means for conveying cylindrical articles to a predetermined row-increasing zone, discharge conveyor means for conveying cylindrical articles away from said row-increasing zone, infeed guide means located above said infeed conveyor means and extending longitudinally thereof for maintaining the cylindrical articles in at least one straight row as they are conveyed by said infeed conveyor means to said row-increasing zone, discharge guide means located above said discharge conveyor means for maintaining the articles in a plurality of rows greater than the number of rows provided by said infeed guide means said plurality of rows having their entrance at the terminus of said row-increasing zone, said discharge guide means maintaining the articles in said plurality of rows with the latter rows located in side by side relation extending longitudinally of said discharge conveyor means, and deflecting means located at said row-increasing zone for receiving articles conveyed thereto by said infeed guide means and for deflecting the articles to said discharge conveyor means, said deflecting means deflecting the articles from the direction in which they are guided by said infeed guide means through an angle of between 25° and 35°.

2. Apparatus for transporting cylindrical articles, comprising infeed conveyor means for conveying cylindrical articles to a predetermined row-increasing zone, discharge conveyor means for discharging articles from said row-increasing zone, infeed guide means located over and extending longitudinally of said infeed conveyor means for guiding cylindrical articles in at least one straight row while they are conveyed by said infeed conveyor means to said row-increasing zone, discharge guide means located over said discharge conveyor means for guiding the cylindrical articles from said row-increasing zone in a plurality of rows greater than the number of rows provided by said infeed guide means with said plurality of rows provided by said discharge guide means being located in side by side relation and extending longitudinally of said discharge guide means said plurality of rows having their entrance at the terminus of said row-increasing zone, and deflecting means at said row-increasing zone deflecting articles from said infeed guide means to said discharge guide means, said deflecting means changing the direction of movement of the articles by approximately 30° while deflecting them from said infeed guide means to said discharge guide means.

3. Apparatus for transporting cylindrical articles, comprising infeed conveyor means for conveying cylindrical articles to a predetermined row-increasing zone, discharge conveyor means located adjacent and receiving cylindrical articles from said row-increasing zone for discharging the articles therefrom, intermediate conveyor means between said infeed and discharge conveyor means for conveying articles received from said infeed conveyor means through said row-increasing zone to said discharge conveyor means, infeed guide means located over said infeed conveyor means for guiding the cylindrical articles in at least one straight row extending longitudinally of said infeed conveyor means as the articles are conveyed thereby to said row-increasing zone, discharge guide means located over and extending longitudinally of said discharge conveyor means for guiding the articles received from said row-increasing zone in a plurality of straight rows the number of which is greater than the number of rows provided by said infeed guide means, said plurality of straight rows having their entrance at the terminus of said row-increasing zone, said discharge guide means maintaining said plurality of rows in side by side relation longitudinally of said discharge guide means, and deflecting means located above said intermediate conveyor means and operatively connected to said infeed guide means and discharge guide means for receiving cylindrical articles from said infeed guide means and delivering them to said discharge guide means, said deflecting means deflecting the direction of movement of the articles through approximately 30° from said infeed guide means to said discharge guide means.

4. Apparatus for transporting cylindrical articles, comprising infeed conveyor means for conveying cylindrical articles to a predetermined row-increasing zone, discharge conveyor means in line with said infeed conveyor means, said discharge conveyor means receiving articles from said row-increasing zone and discharging the articles therefrom, infeed guide means located over and extending longitudinally of said infeed conveyor means for guiding the cylindrical articles in at least one straight row extending longitudinally of said infeed conveyor means as the articles are conveyed thereby to said row-increasing zone, discharge guide means located over said discharge conveyor means and extending longitudinally thereof in a direction substantially parallel to said infeed guide means, said discharge guide means being laterally offset with respect to said infeed guide means and guiding the cylindrical articles in a plurality of rows the number of which is greater than the number of rows provided by said infeed guide means, with said plurality of rows provided by said discharge guide means arranged in side by side relation and extending longitudinally of said discharge conveyor means, and deflecting means extending between and operatively connected to said infeed guide means and discharge guide means for deflecting articles through approximtaely 30° from said infeed guide means to said discharge guide means as the articles move through said row-increasing zone.

5. Apparatus for transporting cylindrical articles, comprising infeed conveyor means for conveying cylindrical articles to a predetermined row-increasing zone, discharge conveyor means for receiving cylindrical articles from said zone and discharging articles therefrom, infeed guide means located over and extending longitudinally of said infeed conveyor means for guiding the cylindrical articles in at least a single straight row as they are conveyed to said row-increasing zone, discharge guide means located over and extending longitudinally of said discharge conveyor means for guiding the discharged articles in a plurality of straight rows the number of which is greater than the number of rows provided by said infeed guide means said plurality of straight rows having their entrance at the terminus of said row-increasing zone, said plurality of rows provided by said discharge guide means being in side by side relation and extending longitudinally of said discharge conveyor means, and said discharge conveyor means conveying the articles in said plurality of rows provided by said discharge guide means at a speed which has with respect to the speed with which the articles are conveyed by said infeed conveyor means the same ratio as the number of rows provided by said infeed guide means to the number of rows provided by said discharge guide means, and deflector means located at said row-increasing zone and operatively connected to said infeed and discharge guide means for deflecting the path of movement of the articles guided by said infeed guide means by approximately 30° while directing the articles to said discharge guide means.

6. Apparatus for transporting cylindrical articles, comprising infeed conveyor means for conveying cylindrical articles to a predetermined row-increasing zone, discharge conveyor means in line with said infeed conveyor means for receiving articles from said row-increasing zone and discharging articles therefrom, at least one elongated straight infeed guide bar located over and extending longitudinally of said infeed conveyor means for guiding cylindrical articles in at least a single straight row to said row-increasing zone, an elongated straight deflector bar at said row-increasing zone fixed at one end to said infeed guide bar and defining approximately an angle of 150° therewith to deflect articles at said row-increasing zone from the direction in which they are guided by said infeed guide bar through approximately 30° while being transported across said row-increasing zone, said deflecting bar having an end distant from said infeed guide bar and situated adjacent to said discharge conveyor means, an elongated straight end discharge guide bar fixed at one end to said end of said deflecting bar which is distant from said infeed guide bar, said end discharge guide bar extending longitudinally of said discharge conveyor means over the latter and being parallel to said infeed guide bar, and a plurality of additional discharge guide bars parallel to each other and said end discharge guide bar and located over and extending longitudinally of said discharge conveyor means, said additional discharge guide bars having ends located adjacent said row-increasing zone and all of said additional discharge guide bars being located on the same side of said end discharge guide bar, said latter side of said end discharge guide bar being opposite from the side thereof where said deflector bar is located, whereby said plurality of discharge guide bars will guide the cylindrical articles in a plurality of rows arranged in side by side relation extending longitudinally of said discharge conveyor means, and the number of rows provided by said discharge guide bars being greater than the number of rows provided by said infeed guide bar.

7. Apparatus for transporting cylindrical articles, comprising infeed conveyor means for conveying articles to a predetermined row-increasing zone, discharge conveyor means located next to and forming an extension of said row-increasing zone, an elongated substantially straight infeed guide bar located over and extending longitudinally of said infeed conveyor means for guiding articles in at least one straight row as they are conveyed to said row-increasing zone, said infeed guide bar extending over part of said row-increasing zone, an elongated straight deflecting bar located at said row-increasing zone, said deflecting bar being connected at one end to said infeed guide bar and extending therefrom to said discharge conveyor means, and said deflecting bar defining with said infeed guide bar an angle of approximately 150° for deflecting articles from said infeed guide bar through an angle of approximately 30° as they are conveyed by said infeed conveyor means toward said discharge conveyor means, and a plurality of elongated straight parallel discharge guide bars located over and extending longitudinally of said discharge conveyor means and having ends located adjacent said row-increasing zone for receiving cylindrical articles therefrom and guiding them in a plurality of rows the number of which is greater than the number of rows provided by said infeed guide bar, said plurality of discharge guide bars including an end discharge guide bar situated between the remainder of said discharge guide bars and said deflecting bar and connected to an end of said deflecting bar distant from said infeed guide bar.

References Cited by the Examiner

UNITED STATES PATENTS

| 1,087,909 | 2/1914 | Culley | 198—76 X |
| 1,713,684 | 5/1929 | Wild | 198—30 |
| 2,555,602 | 6/1951 | Nutt | 198—30 X |
| 2,756,553 | 7/1956 | Ferguson | 198—30 X |

FOREIGN PATENTS 668,956  8/1963  Canada.

EVON C. BLUNK, *Primary Examiner.*

EDWARD A. SROKA, *Examiner.*